US011181253B2

(12) United States Patent
Kulkarni et al.

(10) Patent No.: US 11,181,253 B2
(45) Date of Patent: Nov. 23, 2021

(54) LED FIXTURE HOUSING WITH HINGED SIDE DOOR

(71) Applicant: Appleton Grp LLC, Rosemont, IL (US)

(72) Inventors: Harish P. Kulkarni, Pune (IN); Timothy E. Graff, Arlington Heights, IL (US); Santosh K. Patil, Pune (IN)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 16/819,077

(22) Filed: Mar. 14, 2020

(65) Prior Publication Data

US 2020/0292153 A1 Sep. 17, 2020

(30) Foreign Application Priority Data

Mar. 16, 2019 (IN) ............................ 201921010324

(51) Int. Cl.

| | |
|---|---|
| ***H02G 3/14*** | (2006.01) |
| ***F21V 15/01*** | (2006.01) |
| ***F21V 11/18*** | (2006.01) |
| *F21Y 115/10* | (2016.01) |

(52) U.S. Cl.

CPC ............ *F21V 15/01* (2013.01); *F21V 11/183* (2013.01); *F21Y 2115/10* (2016.08)

(58) Field of Classification Search

CPC ................................. F21V 15/01; H02G 3/14

See application file for complete search history.

(56) References Cited

U.S. PATENT DOCUMENTS

| | | | | | |
|---|---|---|---|---|---|
| 1,685,462 | A * | 9/1928 | Palmer et al. | H02G 3/14 | 361/659 |
| 1,685,490 | A * | 9/1928 | Johansson | H02G 3/083 | 361/665 |
| 2,880,264 | A * | 3/1959 | Ruskin | H02G 3/14 | 174/67 |
| 3,361,289 | A * | 1/1968 | Mattson | F21V 17/102 | 220/840 |
| 3,517,853 | A * | 6/1970 | Aikens | F21S 8/04 | 220/324 |
| 3,811,004 | A * | 5/1974 | Moore | H01R 13/60 | 174/67 |
| 4,967,924 | A * | 11/1990 | Murofushi | H02G 3/14 | 220/3.8 |
| 5,034,866 | A * | 7/1991 | Pujol | F21V 17/107 | 362/240 |
| 5,317,108 | A * | 5/1994 | Prairie, Jr. | H02G 3/14 | 174/67 |

(Continued)

FOREIGN PATENT DOCUMENTS

WO 2015/143213 A1 9/2015

OTHER PUBLICATIONS

Examination Report dated Sep. 26, 2020, issued in corresponding Indian Application No. 201921010324, 6 pages.

*Primary Examiner* — Ismael Negron

(74) *Attorney, Agent, or Firm* — McDonnell Boehnen Hulbert & Berghoff LLP

(57) ABSTRACT

An LED lighting fixture including a side access door and a compartment for housing electrical components required for operation of the LED fixture. The side access door secured to the compartment by a hinge structure, such that the side door is retained when in an open position.

4 Claims, 5 Drawing Sheets

(56) References Cited

U.S. PATENT DOCUMENTS

| | | | | | |
|---|---|---|---|---|---|
| 5,944,209 | A * | 8/1999 | Daoud | H02G 3/14 | |
| | | | | 220/3.8 | |
| 6,007,353 | A * | 12/1999 | Webster | H01R 13/447 | |
| | | | | 439/142 | |
| 6,019,488 | A * | 2/2000 | Hastings | F21V 15/01 | |
| | | | | 362/152 | |
| 6,184,468 | B1 * | 2/2001 | Speziale | H02G 3/14 | |
| | | | | 174/66 | |
| 6,806,426 | B1 * | 10/2004 | Gretz | H02G 3/14 | |
| | | | | 174/481 | |
| 7,619,162 | B2 * | 11/2009 | Dinh | H01R 13/447 | |
| | | | | 174/481 | |
| 9,160,153 | B2 * | 10/2015 | Magno, Jr. | H02G 3/088 | |
| 9,236,723 | B2 * | 1/2016 | Scanzillo | H02G 3/12 | |
| 9,638,398 | B2 | 5/2017 | Nicolai et al. | | |
| 9,869,457 | B1 * | 1/2018 | Lin | F21S 8/033 | |
| 9,995,448 | B2 * | 6/2018 | Brunelli | H05K 5/0247 | |
| 9,995,470 | B2 * | 6/2018 | Matsuda | F21S 8/04 | |
| 10,215,371 | B1 * | 2/2019 | Lehman | F21V 17/20 | |
| 10,627,059 | B2 * | 4/2020 | Duckworth | F21V 15/01 | |
| 2012/0325512 | A1 * | 12/2012 | Namey, Jr. | H02G 3/18 | |
| | | | | 174/50.51 | |
| 2019/0131782 | A1 * | 5/2019 | Sylvester | H01R 13/447 | |
| 2020/0244056 | A1 * | 7/2020 | Ustianowski | H02G 3/081 | |

* cited by examiner

LED FIXTURE HOUSING WITH HINGED SIDE DOOR

RELATED APPLICATIONS

This application claims priority to Indian Patent Application No. 201921010324 entitled “A Self-retaining Side Access Door for an LED Fixture” filed on Mar. 16, 2019, the contents of which are hereby incorporated by reference in their entirety.

FIELD

The present disclosure relates to the field of fixtures, more specifically linear LED fixtures.

Definitions

As used in the present disclosure, the following terms are generally intended to have the meaning as set forth below, except to the extent that the context in which they are used indicate otherwise.

Wiring and driver compartment—The term “Wiring and driver compartment” hereinafter refers to a box or a housing that houses inside it various electrical components required for the functioning of an LED fixture and lighting.

BACKGROUND

The background information herein below relates to the present disclosure but is not necessarily prior art.

In large workspaces like a workshop, a factory, a shopping mall, or a town hall, LED fixture(s) (hereinafter also referred as fixture(s)) are connected to an overhead support structure using a mounting bracket. Usually, the mounting bracket is connected to an operative top portion of the fixture such that the fixture can be moved in a pivotal manner about the mounting bracket. A wiring and driver compartment is provided on the operative top surface of the fixture. The mounting bracket is fixedly attached to the overhead support structure via fasteners. It is not feasible to remove the complete fixture for maintenance of any electrical component housed inside the wiring and driver compartment.

Conventionally, the wiring and driver compartment is provided with a side cover which is screwed to the wiring and driver compartment, typically by normal screws. While carrying out a maintenance or replacement operation of any component inside the wiring and driver compartment, the maintenance personnel is assigned with the task of carefully securing or catching hold of the side cover and the screws immediately after unscrewing them from the wiring and driver compartment. There are chances of the cover and the screws falling onto the floor and causing a safety or an operational hazard. The cover and the screws can injure a person on the floor or fall into a machine/mixer/vessel resulting in unwanted circumstances. Arranging a new cover and screws is time-consuming and results in further delay in the maintenance operation. Thus, removal & assembly of the side-access cover is a cumbersome process.

Therefore, there is felt a need of a self-retaining side-access door for an LED fixture, that alleviates the aforementioned drawbacks of the conventional arrangements.

OBJECTS

Some of the objects of the present disclosure, which at least one embodiment herein satisfies, are as follows:

An object of the present disclosure is to provide a self-retaining side-access door for a wiring and driver compartment of an LED fixture that prevents the fall and misplacement of the side-access door.

Another object of the present disclosure is to provide captive screws for a self-retaining side-access door of a wiring and driver compartment of an LED fixture.

Another object of the present disclosure is to provide easy access to wires, cables, and other electrical components housed inside a wiring and driver compartment of an LED fixture.

Another object of the present disclosure is to provide a self-retaining side-access door for a wiring and driver compartment of an LED fixture that facilitates easy maintenance operation of electrical components of an LED lighting fixture.

Yet another object of the present disclosure is to provide a self-retaining side-access door for a wiring and driver compartment of an LED fixture that reduces operational hazards during a maintenance operation.

Still another object of the present disclosure is to provide a self-retaining side-access door for a wiring and driver compartment of an LED fixture that reduces the time required for maintenance operation of a wiring and driver compartment.

Other objects and advantages of the present disclosure will be more apparent from the following description, which is not intended to limit the scope of the present disclosure.

SUMMARY

The present disclosure envisages a self-retaining side-access door for an LED fixture. The LED fixture comprises a wiring and driver compartment, and an opening configured on an operative longitudinal wall of the LED fixture to provide access to the wiring and driver compartment. The door is mounted at an edge of the opening with the help of a hinge mechanism configured to facilitate self-retainment of the door with respect to the LED fixture.

In an embodiment, the door includes a pin extending from each end of the longitudinal edge of the door.

In another embodiment, the hinge mechanism comprises a pair of retaining means.

Each retaining means is attached to the corner of the opening of the wiring and driver compartment. The retaining means has a slot configured thereon to receive the pin to hingably engage the door with the retaining means.

In yet another embodiment, the retaining means is a hinge plate.

In still another embodiment, the door includes a plurality of captive fasteners configured to secure the door to the LED fixture.

In one embodiment, the door is of a radio-frequency (RF) transparent material.

BRIEF DESCRIPTION OF THE ACCOMPANYING DRAWING

A self-retaining side-access door for a wiring and driver compartment of an LED fixture, of the present disclosure, will now be described with the help of the accompanying drawing, in which.

LIST OF REFERENCE NUMERALS

Figure 1:
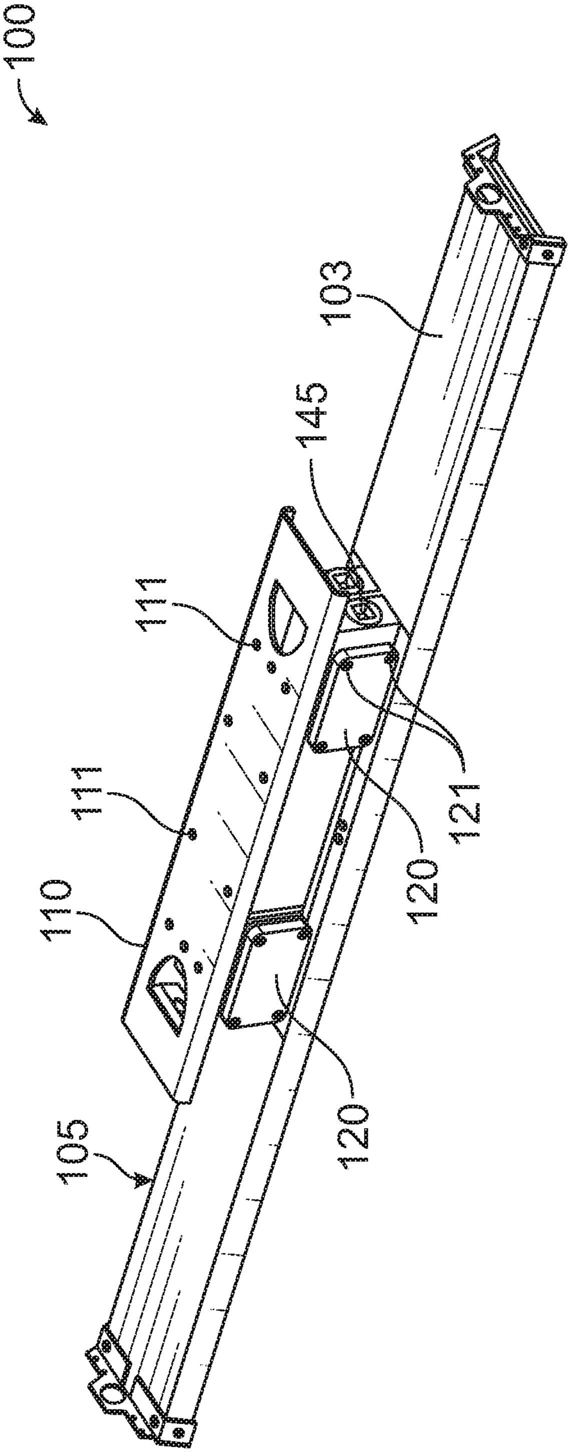
FIG. 1 (Prior Art)
FIG. 1 illustrates an isometric view of a conventional LED fixture with side access covers for a wiring and driver compartment.

100—Conventional mounting arrangement of an LED fixture
103—Holding plate
105—LED fixture
110—Mounting bracket
111—Holes
120—Covers
121—Screws
145—Wiring and driver compartment
200—Mounting arrangement of an LED fixture of the present disclosure
203—Holding plate
205—LED fixture
210—Hinge plates
220—Self-retaining side-access door
221—Captive screws
222—Pins
245—Wiring and driver compartment
250—Mounting bracket
251—Holes and slots on the holding plate
255—Fins or corrugations
260—Electrical connectors

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms “a”, “an”, and “the” may be intended to include the plural forms as well, unless the context clearly suggests otherwise. The terms “comprises”, “comprising”, “including”, and “having” are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being “mounted on”, “engaged to”, “connected to”, or “coupled to” another element, it may be directly on, engaged, connected or coupled to the other element. As used herein, the term “and/or” includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as “inner”, “outer”, “beneath”, “below”, “lower”, “above”, “upper”, and the like, may be used in the present disclosure to describe relationships between different elements as depicted from the figures.

The present disclosure envisages a self-retaining side-access door for a wiring and driver compartment for an LED fixture that prevents the door form falling down during maintenance operations, and alleviates the drawbacks of the conventional arrangement.

FIG. 1 illustrates a conventional arrangement 100 of an LED fixture 105 having a pair of access covers 120 provided on the side of a wiring and driver compartment 145 which houses wires, cables, and other electrical components. The conventional arrangement 100 includes a mounting bracket 110 attached in a removable manner to the wiring and driver compartment 145, a plurality of holes 111 formed on the mounting bracket 110, and a holding plate 103 for receiving LED strips. The wiring and driver compartment 145 is mounted on an operative top surface of the holding plate 103. The holes 111 are configured for receiving mounting bolts to fixedly secure the fixture 105 to an overhead support (not shown in figures). The access covers (120) are fastened onto a wall of the wiring and driver compartment (145) with the help of fasteners. During maintenance or replacement, the access covers (120) have to be completely removed since, the access covers (120) and the screws have to be carefully stored. Loss of either the access covers (120) or the screws can cause a lot of hassles and also consumption of time in finding them or replacing them.

A mounting arrangement 200, of the present disclosure, is now described with reference to FIG. 2 through FIG. 5.

Figure 2:
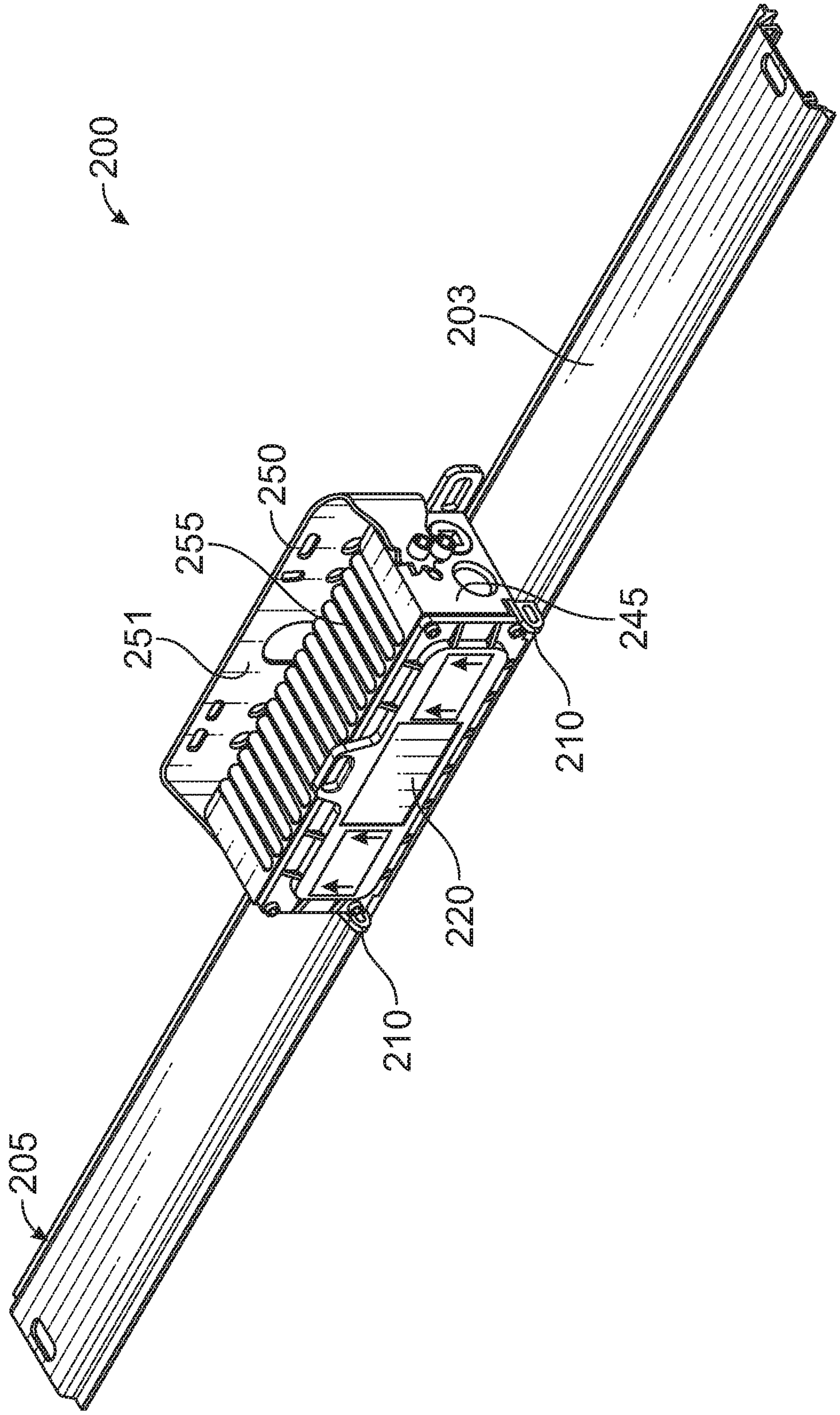
FIG. 2 illustrates an isometric view of a self-retaining side-access door configured on an LED fixture, in accordance with an embodiment of the present disclosure and shown in a closed configuration.
Figure 5:
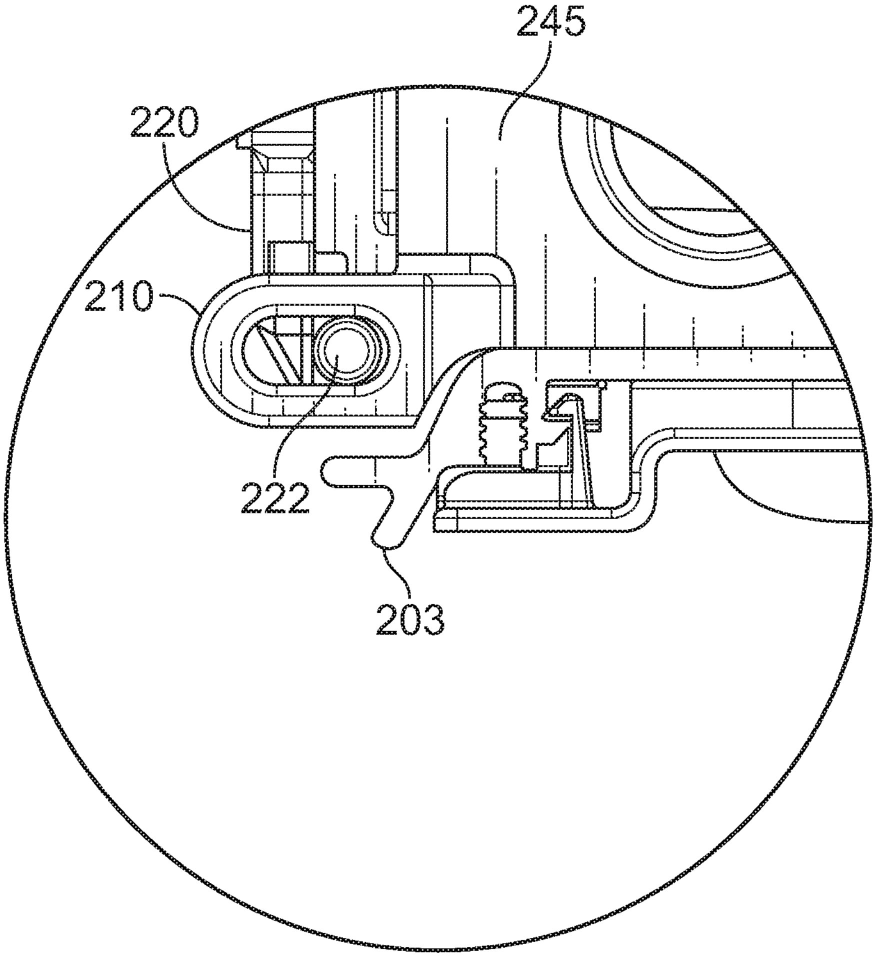
FIG. 5 illustrates an enlarged side view of a hinge mechanism for the self-retaining door of FIG. 2.

FIG. 2 illustrates the mounting arrangement 200 in accordance with an embodiment of the present disclosure. The mounting arrangement 200 of the present disclosure may comprise an LED fixture 205, a holding plate 203, and a wiring and driver compartment 245 mounted on an operative top surface of the holding plate 203. The fixture 205 may be provided with a self-retaining side-access door 220 to the wiring and driver compartment of the LED fixture 205, and a hinge mechanism attached to the wiring and driver compartment 245 for retaining the side-access door 220. A self-retaining means in the form of a hinge plate 210 having a slot formed therein may be connected at each operative bottom corner of the wiring and driver compartment 245, wherein the self-retaining side-access door 220 is pivotally retained therein. As shown in FIG. 5, a pin 222 may be provided at each end of a longitudinal edge of the self-retaining side-access door 220 (hereinafter also referred as door (220)). The pins 222 cooperate with the slots of the hinge plate(s) 210, such that the door 220 becomes captive in the slots of the hinge plate(s) 210 and is free to pivot about an axis passing through the center points of the hinge plates 210. A mounting bracket 250 may be removably attached to the wiring and driver compartment 245 via fasteners. A plurality of holes and slots 251 may be formed on the mounting bracket 250 to facilitate mounting of the LED fixture 205 along with the wiring and driver compartment 245 on the overhead support structure (not shown in figures). A plurality of fins or corrugation 255 may also be provided on the outside surface of the wiring and driver compartment 245 to facilitate heat dissipation.

Figure 3:
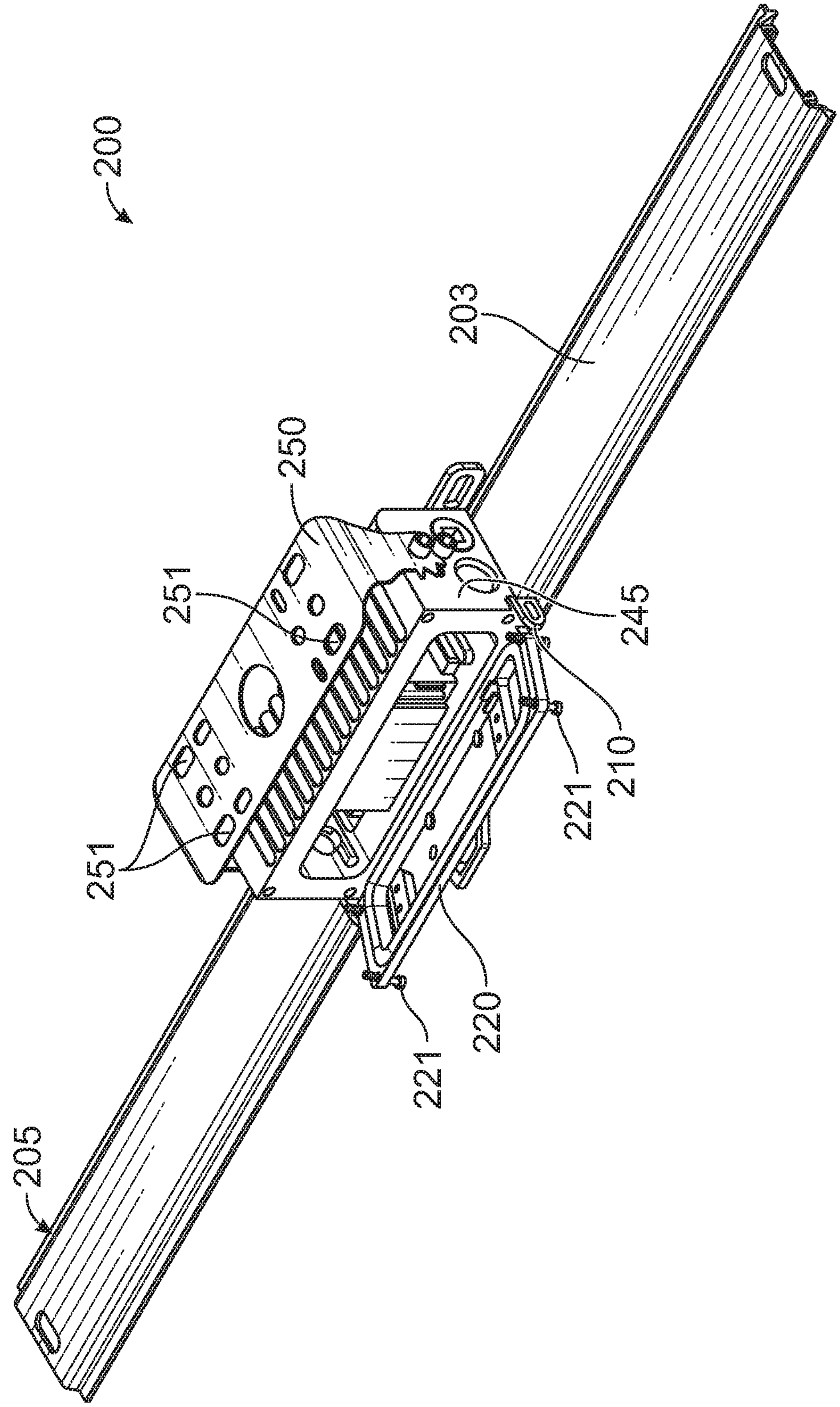
FIG. 3 illustrates an isometric view of the self-retaining side-access door of FIG. 2, shown in an open configuration.

FIG. 3 illustrates the mounting arrangement 200 of FIG. 2 shown in an open configuration in accordance with an embodiment of the present disclosure. A plurality of captive screws 221 may be provided on the door 220 such that the screws 221 do not fall even when the door 220 is opened by the maintenance personnel. The door 220 is held captive inside the slots of the hinge plates 210 via the pins 222 provided on the door 220. The maintenance personnel can conveniently carry out any electrical maintenance activity of the wiring and driver compartment 245 without worrying about the screws 221 and the door 220 falling onto the floor. The plurality of holes and slots 251 formed on the mounting bracket 250 may be of various sizes, shapes, and configurations, to facilitate mounting of the same LED fixture 205 on different types of overhead support structures.

In accordance with an embodiment of the present disclosure, the side-access door 220 may be provided on either side of the wiring and driver compartment 245 of the LED fixture 205.

In accordance with another embodiment of the present disclosure, the holding plate 203 may be formed in various shapes such as to receive a variety of LED arrays and strips.

Figure 4:
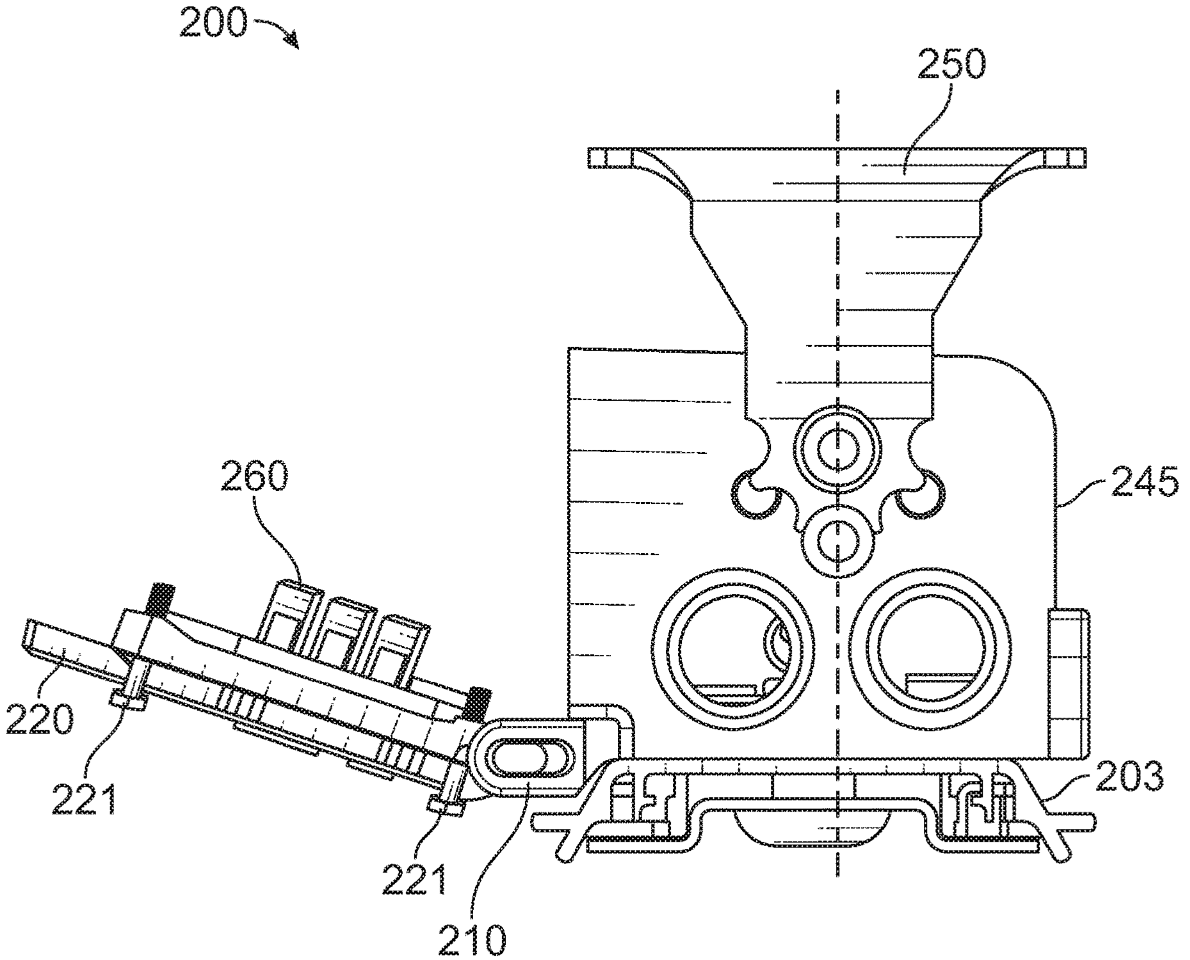
FIG. 4 illustrates a side view of the self-retaining side-access door of FIG. 3.

FIG. 4 illustrates a side view of the mounting arrangement 200 of FIG. 3. The door 220 may be configured to facilitate the mounting of a plurality of electrical components 260, on the inner surface of the door 220. These components 260 are in electrical connection with the other components placed inside the wiring and driver compartment 245. According to an aspect of the present disclosure, the electrical components 260 are accessible when the door 220 is in an open configuration. Thus, the maintenance personnel can easily carry out any maintenance or replacement of the electrical components 260. Once the maintenance or replacement of the components 260 is completed, the door 220 is closed such that the components 260 are received into the wiring and driver compartment 245.

In accordance with another embodiment of the present disclosure, the door 220 for wiring and driver compartment 245 may be of a Radio-frequency (RF) transparent material.

In accordance with yet another embodiment of the present disclosure, the wiring and driver compartment 245 may house a wireless communication device, an antenna, and other components required for remotely controlling the operation of the LED fixture.

The door 220 of the wiring and driver compartment 245 in accordance with the present disclosure ensures that the door 220 remains captive therein. The self-retaining door 220 does not become loose even after the screws 221 are unscrewed.

This makes it easy for the maintenance personnel to perform on-field servicing and replacement activity, even at roof level of a town-hall, a workshop, or a factory.

FIG. 5 illustrates the hinge-mechanism of the self-retaining door 220. The pins 222 of the door 220 are received by the slots formed in the hinge plates 210 to allow pivotal movement of the door 220.

The implementation of the present disclosure ensures ease of field wiring of the LED fixture 205 in a roof mounted condition. The self-retaining door 220 and the captive screws 221 reduce labor efforts, time, and cost of maintenance of the LED fixture 205. This also reduces interruption in normal operations on the floor during maintenance of the LED fixture.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a self-retaining side-access door for an LED fixture that:

- is easy to operate;
- prevents falling of the side-access door and screws during maintenance operation;
- facilitates easy maintenance operation of electrical components of an LED fixture;
- eliminates any safety hazard to employees working on the floor; and
- eliminates any operational hazard to a machine or a process on the floor.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. An electrical housing for use with an LED lighting fixture, the housing comprising:

a compartment defining an interior space and an opening providing access to the interior space from and outside of the compartment;

a side access door configured to be moved from a closed configuration closing the opening of the compartment, and an open configuration allowing access to the interior space;

a pair of flanges extending outwardly and externally from a lower end of the LED lighting fixture, each of the flanges including an elongated slot; and a pin protruding from each end of a longitudinal edge of the side access door and extending into a corresponding one of the elongated slots to attach the side access door to the compartment when in the open configuration.

2. The LED lighting fixture as claimed in claim 1, wherein the side access door further includes an operative inner surface configured to receive electrical components, such that in the open configuration the components are accessible and in the closed configuration the components are received in the compartment.

3. An LED fixture comprising:

a compartment having an opening formed on a wall of said compartment to provide access to said compartment;

a pair of flanges extending outwardly and externally from a lower end of said LED fixture, each of said flanges including an elongated slot; and a door including a pin protruding from each end of a longitudinal edge of said door and extending into a corresponding one of said elongated slots to hingedly engage said door with said LED fixture.

4. The door as claimed in claim 3, further comprising a plurality of captive fasteners configured to secure said door to said LED fixture.

* * * * *